United States Patent

Cornie

[19]

[11] Patent Number: 5,937,932
[45] Date of Patent: Aug. 17, 1999

[54] CASTING TOOLING

[75] Inventor: James A. Cornie, Cambridge, Mass.

[73] Assignee: Massachusetts Institute of Technology, Cambridge, Mass.

[21] Appl. No.: 09/027,535

[22] Filed: Feb. 23, 1998

Related U.S. Application Data

[62] Division of application No. 08/588,909, Jan. 19, 1996, Pat. No. 5,730,915, which is a continuation of application No. 08/164,377, Dec. 8, 1993, abandoned.

[51] Int. Cl.$^6$ .................................. B22C 1/22; B22C 9/06
[52] U.S. Cl. ........................... 164/526; 164/349; 164/369
[58] Field of Search ................................... 164/526, 349, 164/369, 5

[56] References Cited

U.S. PATENT DOCUMENTS

| | | | |
|---|---|---|---|
| 2,997,400 | 8/1961 | Greenewald, Jr. | 106/38.9 |
| 3,519,056 | 7/1970 | Bickerdike et al. | 164/16 |
| 3,893,928 | 7/1975 | Ono et al. | 252/1 |
| 3,907,950 | 9/1975 | Bickerdike et al. | 264/29 |
| 4,162,238 | 7/1979 | Bergna | 164/43 |
| 4,348,343 | 9/1982 | Akerberg et al. | 264/29.5 |
| 4,349,386 | 9/1982 | Davidovits | 106/85 |
| 4,457,352 | 7/1984 | Scheffer | 164/5 |
| 4,472,199 | 9/1984 | Davidovits | 106/85 |
| 4,492,265 | 1/1985 | Donomoto et al. | 164/493 |
| 4,832,105 | 5/1989 | Nagan et al. | 164/61 |
| 4,888,311 | 12/1989 | Davidovits et al. | 501/95 |
| 5,010,945 | 4/1991 | Burke | 164/97 |
| 5,094,289 | 3/1992 | Gentry | 164/529 |
| 5,111,870 | 5/1992 | Cook | 164/61 |
| 5,111,871 | 5/1992 | Cook | 164/63 |
| 5,113,925 | 5/1992 | Cook | 164/35 |
| 5,119,864 | 6/1992 | Langensiepen et al. | 164/97 |
| 5,178,673 | 1/1993 | Caster et al. | 106/38.2 |
| 5,394,930 | 3/1995 | Kennerknecht | 164/112 |

FOREIGN PATENT DOCUMENTS 1 342 599   1/1974   United Kingdom .

OTHER PUBLICATIONS

"Nonmetallic Castable Tooling For Advanced Composites", M.S. Loyd, pp. 1–3, 1978, 33rd Annual Technical Conference, 1978 Reinforce Plastics/Composites Institute The Society of the Plastics Industry, Inc.

"High pressure infiltration casting: manufacturing net shape composites with a unique interface", Ram B. Bhagat, pp. 243–251, 1991, Materials Science and Engineering, A144.

"Discussion of a liquid metal pressure infiltration process to produce metal matrix composites", Joseph T.Blucher, pp. 381–390, 1992, Journal of Materials Processing Technology, 30.

"Designing Interfaces in Inorganic Matrix Composites", James A. Cornie et al., pp. 32–38, 1991, MRS Bulletin, 16.

"Wetting of Ceramic Paticulates with Liquid Aluminum Alloys", Se–Yong Oh, pp. 105–107, 1987, Ph.D. Thesis, Massachusetts Institute of Technology.

(List continued on next page.)

*Primary Examiner*—P J Ryan
*Assistant Examiner*—Anjan Dey
*Attorney, Agent, or Firm*—Testa, Hurwitz & Thibeault, LLP

[57] ABSTRACT

The invention provides methods for producing semi-permanent casting tooling, as well as semi-permanent casting tooling apparatus. Casting tooling including a blend of high char resin and refractory powder; casting tooling prepared from a blend of sol-gel ceramic precursor and refractory powder; and a preform including a leachable core as well as methods for their production are provided. The casting tooling of the invention can be used in casting processes including die casting, permanent mold casting and pressure infiltration casting. Also provided is an investment mold casting technique compatible with a pressure infiltration process.

9 Claims, 5 Drawing Sheets

OTHER PUBLICATIONS

"Pressure Infiltration Processing of P–55 (Graphite) Fiber Reinforced Aluminum Alloys", J. Cornie et al., pp. 851–875, 1990, *Ceramic Transactions, Advanced Composite Materials: Processing, Microstructures, Bulk and Interfacial Properties, Characterization Methods, and Applications*, 19.

"Pressure Casting of Fiber–Reinforced Metals", L. J. Masur et al., pp. 2.320–2.329, 1987, *ICCM–VI, Proceedings of the Sixth International Conference on Composite Materials, London*, 1987.

"Particulate Wetting and Particle:Solid Interface Phenomena in Casting Metal Matrix Composites", K.C. Russell et al., pp. 61–91, 1986, *Proceedings of the Symposium on Interfaces in Metal Matrix Composites, New Orleans, Louisiana TMS–AIME, 1986*.

"Pressure infiltraiton casting of metal matrix composites", A.J. Cook et al., pp. 189–206, 1991, Materials Science and Engineering, A144.

"Kinetics of Fiber Preform Infiltration", Andreas Mortensen et al., pp. 7–13, 1988, *Proceedings of the International Symposium on Advances in Cast Reinforced Metal Composites, Chicago, Illinois, 1988*.

"Researchers overcome barriers to Gr/Mg composites", no author listed, pp. 66–67, 1987, Research & Development, Apr. 1987.

"Geopolymer: Ultra–High Temperature Tooling Material for the Manufacturing of Advanced Composites", M. Davidovics et al., pp. EM9Q–182–182–11 1990, Tooling For Composites, Jun. 5–7, 1990, Anaheim, California, Society of Manufacturing Engineers.

"Geopolymer: Ultra–High Temperature Tooling Material For the Manufacturing Of Advanced Composites", J. Davidovits et al., pp. 1939–1949, 36th International SAMPE Symposium, Apr. 15–18, 1991.

"Geopolymer: Room–Temperature Ceramic Matrix for Composites", J. Davidovits et al., pp. 835–841, 1988, Ceram. Eng. Sci. Proc., 9.

CASTING TOOLING

This is a division of Ser. No. 08/588,909, filed Jan. 19, 1996, now U.S. Pat. No. 5,730,915 which is a continuation of Ser. No. 08/164,377, filed Dec. 8, 1993, now abandoned.

The United States government has rights in this invention based on grant N00014-90-J-1812 from the Office of Naval Research.

BACKGROUND OF THE INVENTION

1. Field of the Invention

The invention relates to a method for producing tooling and to tooling apparatus for use in casting. More particularly, the invention relates to a method for producing a mold and to a mold for casting.

2. Description of the Prior Art

Casting methods require tooling such as a mold for containing the material to be cast and imparting a shape to that material. Common casting techniques include pressure infiltration casting, die casting and permanent mold casting.

Pressure infiltration casting is a process wherein a pressure differential is used to drive infiltration of a molten infiltrant into an empty mold to produce an unreinforced casting or into a mold containing a preform to produce a reinforced casting. Such a pressure differential can be established, for example, by evacuating the mold and placing the evacuated mold in a pressure vessel where a pressurized gas provides the pressure differential needed to drive the molten infiltrant into the mold. A gas-tight environment is required so that entrapment of gas pores or pockets does not create defects in the finished casting which can be provided by a mold container. Using pressure infiltration casting, it is possible to controllably cast highly loaded, continuously reinforced and discontinuously, i.e., particulate, reinforced composites to net shape and with a dimensional tolerance of ±0.0002 in with a surface finish of 4 microinches or 0.1 micron i.e., a superfinished surface like a mirror finish. Pressure infiltration casting can also be used to produce highly detailed unreinforced castings characterized by similar dimensional accuracy and smoothness. To achieve such results, machined graphite molds are typically utilized. Alloys cast with graphite molds include aluminum, magnesium and copper alloy castings. While graphite is easily machined and takes on a highly smooth finish, the graphite material and machining are expensive. Also, a graphite mold has a limited lifetime.

In pressure infiltration casting of reinforced composites, gas entrapment within the preform must be avoided so that gas pores or pockets will not create defects in the finished casting. A vacuum is isolated in the preform during pressure infiltration to eliminate such defects caused by entrapped gas. Since any gas leak will reduce the pressure gradient for infiltration, thereby resulting in incomplete infiltration and entrapped gas porosity in the finished casting, conventional, porous investment casting compounds cannot be used in pressure infiltration processes.

Permanent mold casting is a process which is described in ASM *Metals Handbook*, Ninth Edition, V. 15, page 275, as "gravity die casting, a metal mold consisting of two or more parts ... repeatedly used for the production of many castings of the same form". Die casting is a process, as also given by ASM *Metals Handbook*, Ninth Edition, V.15, page 286, "characterized by a source of hydraulic energy that imparts high velocity to molten metal to provide rapid filling of a metal die. The die absorbs the stresses of injection, dissipates the heat contained in the metal, and facilitates the removal of the shaped part in preparation for the next cycle. The hydraulic energy is provided by a system that permits control of actuator position, velocity, and acceleration to optimize flow and force functions on the metal as it fills the cavity and solidifies." Steel molds are conventionally used in die casting and permanent mold casting processes. Materials die cast and permanent mold cast in steel molds include alloys of aluminum, magnesium and zinc. Machined graphite molds have a lower coefficient of thermal expansion than steel molds and produce castings characterized by higher tolerances at a lower cost than steel molds of comparable tolerance. However, graphite molds oxidize above 400 C. and must be coated, resulting in a shorter lifetime for the graphite molds than for comparable steel molds which typically have lifetimes of approximately 40,000 castings for die casting and up to 100,000 castings for permanent mold casting. When large numbers of parts are being cast, steel molds are, therefore, more economical than graphite molds for die casting and permanent mold casting.

When large numbers of parts are being cast by any of the already-described processes, mold properties and production become key factors determining the economics of the casting process. Thus, there exists a need for a semi-permanent mold made of a mold material conformable to the fine details of a part shape and also characterized by sufficient green strength to allow removal of the mold material from the pattern for the part shape. The mold must undergo curing and outgassing without distortion or excessive shrinkage. The cured, finished mold must be strong and shock resistant so that it can be used for many castings. Also, high mold thermal conductivity is desired to enhance the solidification rate in pressure infiltration, die casting and permanent mold casting processes. A need also exists for a gas-tight standard investment compound mold for use with a pressure infiltration process for production of reinforced composites.

SUMMARY OF THE INVENTION

The invention provides a method for making a semi-permanent mold, as well as a semi-permanent mold apparatus which is conformable to the fine details of a part shape while being characterized by sufficient green strength to allow removal from a pattern of the part shape. The mold produced according to the invention retains dimensional stability during curing and is strong enough to be reused for numerous castings, making the casting process economically feasible. Also, the mold of the invention is usable in pressure infiltration casting of unreinforced and reinforced castings by pressure infiltration techniques.

In one aspect of the invention, a method is provided for making casting tooling by blending a high char resin and a refractory powder to form a plastic, moldable material, shaping the plastic moldable material to form a green casting tooling body and heating the green tooling body to convert the high char resin into a carbon char to result in the finished casting tooling.

According to another aspect of the invention, a casting tooling apparatus characterized by a high enough density to withstand the pressure encountered in a casting process including a high char resin and a refractory powder is provided.

In an aspect of the invention a method for preparation of casting tooling by blending a sol-gel ceramic precursor and a refractory powder to form a plastic moldable material; shaping the plastic moldable material to form a green tooling body; and heating the green tooling body to convert the sol-gel ceramic precursor into a ceramic to produce the finished casting tooling is provided.

According to other aspects of the invention, a preform including first and second plys which further include a continuous reinforcement fiber separated by a leachable core positioned between the first and second plys and a method for making such a preform are provided.

Finally, in another aspect of the invention, a pressure infiltration process which includes a step of surrounding a preform with molten infiltrant to isolate a vacuum within the preform is also provided.

DETAILED DESCRIPTION OF THE INVENTION

Figure 1:
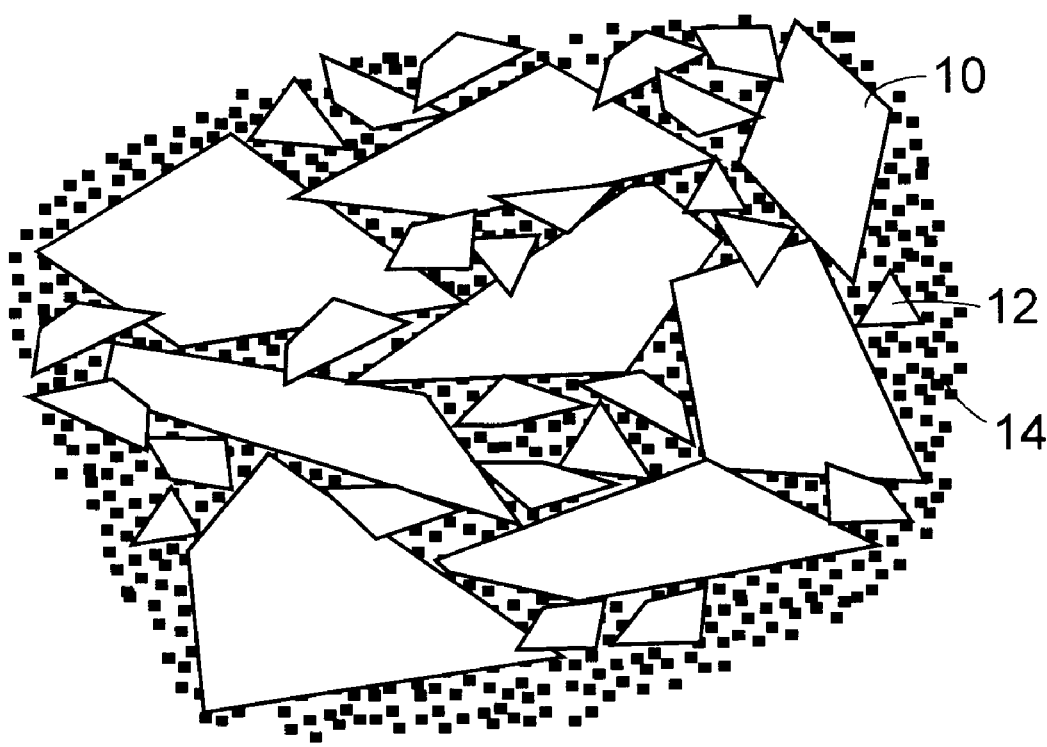
FIG. 1 is a schematic illustration of a blend of refractory powders having different particle sizes in a binder material.

The invention in its several aspects provides semi-permanent casting tooling and methods for producing the casting tooling which are less expensive than production of machined graphite or machined steel tools commonly used in permanent mold casting, die casting and pressure infiltration casting. Furthermore, the tooling provided by the invention is usable in a pressure infiltration process.

According to a method of the invention, such casting tooling can be made by blending a high char resin with a refractory powder to form a moldable plastic material; shaping the material into a green tooling body; and heating the green tooling body to convert the high char resin into a carbon char to form the finished casting tooling. The high char resin can be characterized by a char yield which as used herein in the specification and claims refers to the amount of carbon which remains after heating the resin to a temperature at which the resin decomposes.

For example, a commercially available material, Plenco 11965™ liquid resin, manufactured by Plastics Engineering Company, is an unfilled phenolic with a specific gravity of 1.175 to 1.2340 g/cc and polymerizes to a solid body with a solid content of 81% to 86% of the original material after three hours at 135 C. or a density of approximately 1 g/cc. If there were no volatiles present, the Plenco 11965™ resin can be said to have a char yield of 44% as compared with graphite which has a density to 2.25 g/cc. Another commercially available product Plenco 05350™ is filled with graphite and has a molded density of 1.78 g/cc. Upon heating to high carbonization temperatures, the density increases to 1.788 g/cc which by comparison with graphite's density of 1.788 g/cc can be considered a char yield of 80%.

In selection of a resin, several factors must be taken into consideration. While a high char yield is desirable so that the final material produced has a volume fraction of solids of in the range of from about 0.85 to about 1.0, the material must have a workable, moldable viscosity and consistency.

Resins having char yields in the range of from about 30% to about 95%, more preferably in the range of from about 45% to about 90% and most preferably in the range of from about 60% to about 90% are suitable for use in the method of the invention. High char resins include organic resins such as phenolformaldehyde, phenolic resins, petroleum pitch, coal tar, polyacrylonitrile and furfuryl alcohol-derived binders.

The high char resin is mixed with a refractory powder which as used herein in the specification and claims refers to a powdered material characterized by a high melting temperature, typically in excess of about 1000 C. such as silicon carbide, silicon nitride, titanium carbide, titanium nitride, boron carbide, mullite, alumina silicates, graphite, alumina, zirconia, yttria, silica or mixtures thereof. The refractory powder is mixed with the high char resin at a refractory powder volume fraction which is appropriate to form a stiff mixture having a consistency appropriate to form a self-supporting green tooling body which maintains high dimensional stability during heating to convert the high char resin into carbon char. The viscosity of the mixture can be adjusted as necessary for processing by addition of solvent to the high char resin or by other means as would be understood by one skilled in the art.

The volume fraction that is not filled by the packed refractory powder is filled in with high char resin, which can further include a filler such as graphite powder. When the resin is converted to a char, assuming a 60% char yield for the high char resin, for the purposes of illustration, the 0.45 volume fraction occupied by the high char resin will be filled carbon char which is 60% of the original 0.45 volume fraction of the resin. Thus, the final density of the high char resin and refractory powder after conversion of the resin to char will be 0.55+(0.60×0.45)=0.82. In order to obtain a particular final packing density, both the volume fraction of the high char resin originally present as well as its char yield must be taken into consideration. The effective char yield of the high char resin can be increased by including a graphite filler in the high char resin before combining it with the refractory powder. Using these techniques, final packing densities approaching the 85%–90% of conventionally available graphite tooling can be achieved.

The refractory powder can have a low coefficient of thermal expansion and a high thermal conductivity and can impart these desirable characteristics to the tooling body. Thus, for example, producing a mold which retains high dimensional tolerances through processing and is sufficiently thermally conductive, characterized by a thermal conductivity in the range of from about 75 W/m-K to about 250 W/m-K to provide controlled solidification. It is noted for the sake of comparison that steel has a thermal conductivity in the range of from about 40–80 W/m-K. Silicon carbide, for example, has a low coefficient of thermal expansion of approximately $4 \times 10^{-6}$/K and high thermal conductivity of approximately 180 W/m-K. A refractory powder material having a coefficient of thermal expansion in the range of from about $3 \times 10^{-6}$/K to about $10 \times 10^{-6}$/K and a thermal conductivity in the range of from about 30 W/m-K to about 300 W/m-K is suitable for use in the method of the invention.

The high char resin can also be mixed with a catalyst that will cause cross-linking and setting of the polymer to create a semi-rigid body before the heating step to convert the high char resin to carbon char. For example, Plenco 11956™ resin was mixed with Plenco 11704™ catalyst, a mixture of sulphonic acid, water and phosphoric acid to catalyze setting of the resin. The resin was later converted to vitreous carbon by slow heating to 1000 C. Alternatively, the high char resin can be thermally set during the early stages of the heating step.

Since, during the heating of the high char resin to convert it to carbon char, it is necessary that volatile substances such as water, carbon dioxide and hydrocarbons resulting from the decomposition of the resin and the pyrolysis to carbon be removed from the green tooling body, finely divided cellulose or wood flour can be mixed with the high char resin and refractory powder. When the cellulose or wood flour burns away during the heating process, but before the conversion of the high char resin to carbon char, it will leave behind interconnected porosity which will allow venting of volatiles from the high char resin which is undergoing conversion.

The plastic moldable material can be shaped using a molding technique such as pressing, for example, with a hydraulic press, injection molding, compression molding, casting or by ramming the plastic moldable material around a pattern.

The green tooling body can be heated to a temperature in the range of from about 800 C. to about 2000 C., more preferably in the range of from about 850 C. to about 1700 C. and most preferably in the range of from about 900 C. to about 1500 C. The heating process can be carried out in a vacuum or inert atmosphere in order to prevent oxidation of the carbon. At temperatures of approximately 800 C., the high char resin conversion product is predominantly glassy carbon. At higher temperatures in excess of 1200 C., the carbon becomes more graphitic in nature. At temperatures of approximately 800 C., the high char resin conversion product is predominantly glassy carbon. At higher temperatures in excess of 1200 C., the carbon becomes more graphitic in nature. The more graphitic the char, the higher the conductivity. Hence the conductivity of tooling made from more highly graphitic carbon will increase. A more highly conductive tool will result in more rapid heat removal from the mold, hence more rapid solidification rates. This leads to greater productivity for the casting process in which the tooling is used.

The finished casting tooling is characterized by a sufficiently high density which can be in the range of from about 60% to about 95%, more preferably in the range of from about 65% to about 95% and most preferably in the range of from about 75% to about 95% to withstand the pressure encountered during the casting process, such as permanent mold casting, die casting or pressure infiltration casting in which the casting tooling can be used as a mold for casting a shaped part. As used herein, in the specification and claims, the term "percent density" refers to 100–the void percent or, equivalently, (1–void fraction)×100.

The invention also provides casting tooling prepared according to the already-described method and casting tooling apparatus including a high char resin and a refractory powder wherein the high char resin and the refractory powder have the already-described characteristics. Furthermore, the refractory powder can itself be a blend of a first refractory powder characterized by a first refractory powder particle size and a second refractory powder characterized by a second refractory powder particle size. The blend can be selected to give a desired refractory powder volume fraction as shown schematically in FIG. 1 where 2 parts by volume of –80 to +100 mesh (177–149 micron) ceramic powder 10 is mixed with one part by volume of –325 to +400 mesh (44–37 micron) ceramic powder 12 and with 1.5 parts by volume high char resin 14 to which 600 mesh (15 micron) graphite particles have been added to result in a blend having approximately 0.50 volume fraction graphite. Such blends can result in 85% to 90% dense carbonized composites.

The invention also provides a method for producing pressure infiltration tooling including steps of blending a sol-gel ceramic precursor with a refractory powder to form a moldable material; shaping the moldable material to form a green tooling body; and heating the green tooling body to convert the sol-gel ceramic precursor into a ceramic to form the finished casting tooling. The sol-gel precursor can be a precursor such as an alumina, zirconia or silica sol-gel precursor and the refractory powder can be a powder such as silicon carbide, silicon nitride, titanium carbide, titanium nitride, boron carbide, mullite, alumina silicates, graphite, alumina, zirconia, yttria, silica and mixtures thereof. The volume fractions of sol-gel ceramic precursor and of refractory powder combined can be selected to result in casting tooling having the required thermal conductivity, coefficient of thermal expansion, and density needed to fulfill the demands of the particular casting process in which the casting tooling is to be used. The heating conditions required to result in the appropriate conversion of sol-gel ceramic precursor into ceramic can be determined by one skilled in the art of sol-gel chemistry.

The plastic moldable mixture including the sol-gel precursor and refractory powder can be shaped using a molding technique such as pressing, for example, with a hydraulic press, injection molding, compression molding, casting or by ramming the plastic moldable material around a pattern.

The invention also provides a preform including first and second plys which each further include a continuous reinforcement fiber and are separated by a leachable core positioned between the plys. As used herein in the specification and the claims, a ply refers to a layer of continuous reinforcement fibers aligned at an approximately constant spacing in a plane. Since the core is dissolvable, it can be leached away after the casting process is over and before final finish machining.

The first and second plys can also include a binder mixed with the continuous reinforcement fiber. As used herein in the specification and the claims, the term continuous reinforcement fiber is used to refer to a fiber which is for the most part continuous from one end of the ply to another. While the yarn may include a few broken fibers, they are in the minority, as distinguished from discontinuous reinforcements such as short or chopped fibers, whiskers and particles. A parameter known as the average length to diameter ratio (l/d) is sometimes used to distinguish continuous reinforcements from discontinuous reinforcements. Assuming that the fibers are aligned parallel to each other, fibers having l/d greater than 30 as defined by the shear lag equations commonly used in composite material mechanics, behave mechanically as if they were continuously reinforced. Continuous fibers include monofilament continuous reinforcement fibers such as silicon carbide, boron carbide, titanium carbide, sol-gel-derived alumina, sapphire, yttrium aluminum garnet(YAG), yttria-alumina eutectic and boron-containing monofilaments and mixtures thereof as well as multifilament tow continuous reinforcement fibers such as aluminum oxide, organometallic-derived silicon carbide, organometallic-derived silicon nitride, pitch-based graphite, organometallic-derived titanium carbide, polyacrylonitrile-based multifilament tows and mixtures thereof.

The binder can be a material which can be volatilized at a temperature in the range of from about 100 C. to about 650 C., more preferably in the range of from about 200 C. to about 450 C. and most preferably in the range of from about 250 C. to about 350 C. and can be a polymer such as acrylics, polystyrene, polyvinyl alcohol or trimethylbutanol. The binder can be volatilized in a vacuum or inert atmosphere. The acrylic can be polymethylmethacrylate, acrylic acid, 3-chloro-cis acrylic acid and 3-(2 furyl) trans acrylic acid. Additionally, the binder can include an organic solvent which can be volatilized at a temperature in the range of from about 0 C. to about 200 C., more preferably in the range of from about 20 C. to about 150 C. and most preferably in the range of from about 30 C. to about 100 C. such as toluene, ethanol, methanol, acetone or ether.

A hybridizing material such as titanium diboride, aluminum oxide, yttrium oxide, boron nitride, silicon carbide, silicon nitride, titanium carbide, zirconium carbide, hafnium carbide, tungsten carbide, niobium carbide, boron carbide, titanium nitride, zirconium nitride or hafnium nitride ceramic powder or a metal powder such as Mo, W, Cr, Nb or Ta or mixtures thereof.

The leachable core component of the preform is a material which can withstand the processing temperatures used in the production of intermetallic and superalloy matrix composites and is soluble in a solvent so that it can be leached away to leave behind channels or voids in the finished cast composite part. The leachable core can be soluble in an aqueous solvent or molten caustic and can be a refractory material such as calcium oxide, silica, alumina, mullite or aluminum silicates. The leachable core material can be provided as continuous planar material or as discrete particles having round, rod-like or bar-like shapes.

A method for making a preform includes the steps of providing at least two reinforcement plys and placing a leachable core material between the two plys as shown schematically in FIGS. 2–11.

Figure 2:
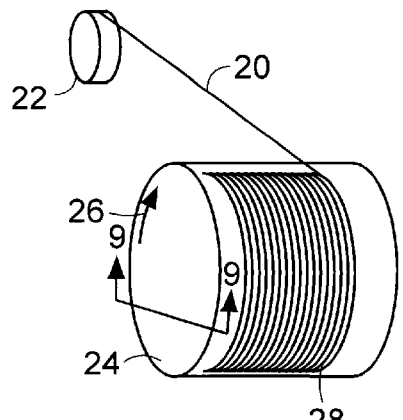
FIG. 2 is a schematic illustration of the step of wrapping a continuous monofilament reinforcement in production of a leachable core preform.
Figure 3:
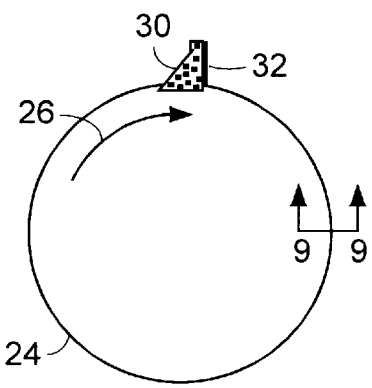
FIG. 3 is a schematic illustration of the step of doctoring binder slurry onto the wrapped continuous monofilament shown in FIG. 2.
Figure 4:
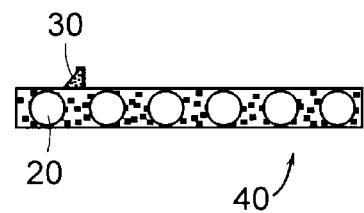
FIG. 4 is a schematic illustration in cross-section of a single ply of the continuous monofilament fiber reinforcement shown in FIG. 2 embedded in the binder applied during the doctoring step shown in FIG. 3.
Figure 5:
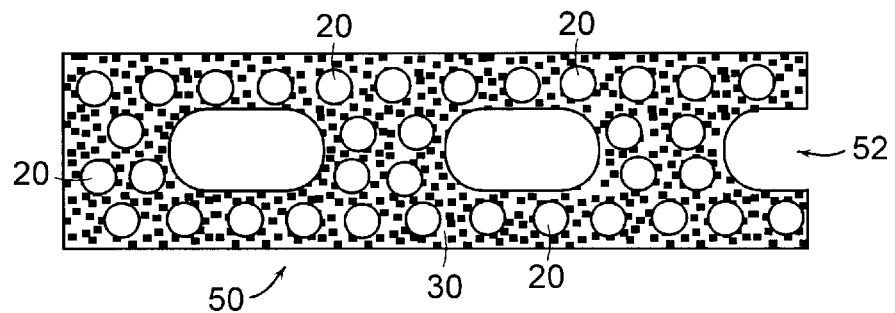
FIG. 5 is a schematic illustration in cross-section of a leachable core preform including several of the plys shown in FIG. 4.

Continuous fiber reinforcement 20 is unwound from supply spool 22 and wrapped around mandrel 24 in the direction given by arrow 26 to form reinforcement mat 28 as shown in FIG. 2. Binder 30 is applied to reinforcement mat 28 using rubber doctor blade 32 as mandrel 24 rotates in the direction given by arrow 26 as shown in FIG. 3 which is a view along section 9—9 of FIG. 1. After the binder is combined with reinforcement mat 28, a reinforcement ply 40 including a monolayer composed of binder 30 and continuous fiber reinforcements 20 is produced as shown in FIG. 4. The reinforcement ply can be a single row of monofilaments or a single row of multifilament tow. If the ply includes monofilaments, a filler or hyrbridizing material is needed to keep them in place. The multifilament tows are "self-bulking" and can be kept in place simply by the wrapping process or with a clamp if the fiber volume fraction is high enough of order 0.55. The leachable cores can be rods which are laid in place and the plys of the desired thickness are laid in place and stacked to fill the spaces between the pre-assembled cores.

Resulting preform 50 includes calcium oxide leachable cores 52 surrounded by binder 30 and continuous fiber reinforcements 20. The leachable cores can also be made from other ceramic materials such as fused silica. The calcium oxide cores can be leached by water and the fused silica cores can be leached by a molten caustic such as NaOH, KOH, CaOH or blends thereof as selected to result in a desired melting point for the caustic; a hot aqueous caustic such as NaOH, KOH, CaOH or blends thereof or a hydrofluoric acid bath.

A method and apparatus for pressure infiltration casting of a reinforced composite is also provided. According to one step of the method, an evacuated preform is surrounded with molten infiltrant to isolate a vacuum in the preform. The infiltrant can be an alloy such as NiAl, $Ni_3Al$, TiAl, Al-based alloys, Mg-based alloys, Cu-based alloys, Zn-based alloys, Ni-based alloys, Fe-based alloys, Co-based alloys or stainless steels.

The pressure infiltration method can be used with a preform containing continuous monofilament reinforcement fiber such as silicon carbide, boron carbide, titanium carbide, sol-gel-derived alumina, sapphire, yttrium aluminum garnet(YAG), yttria-alumina eutectic or boron-containing monofilaments or aluminum oxide, organometallic-derived silicon carbide, organometallic-derived silicon nitride, pitch-based graphite, organometallic-derived titanium carbide, polyacrylonitrile-based multifilament tows or mixtures thereof combined with a binder. These continuous reinforcement fibers such as silicon carbide, boron carbide, titanium carbide, sol-gel-derived alumina, sapphire, yttrium aluminum garnet(YAG), yttria-alumina eutectic and boron-containing monofilaments and aluminum oxide, organometallic-derived silicon carbide, organometallic-derived silicon nitride, pitch-based graphite, organometallic-derived titanium carbide, polyacrylonitrile-based multifilament tows and mixtures thereof can also be combined with a binder and a particulate reinforcement such a titanium diboride, aluminum oxide, yttrium oxide, boron nitride, silicon carbide, silicon nitride, titanium carbide, zirconium carbide, hafnium carbide, tungsten carbide, niobium carbide, boron carbide, titanium nitride, zirconium nitride, hafnium nitride, Mo, W, Cr, Nb, Ta or mixtures thereof to form a hybrid preform. The preform can also include a leachable phase which can be dissolved in an appropriate solvent to create voids in the finished casting usually before machining.

Figure 6:
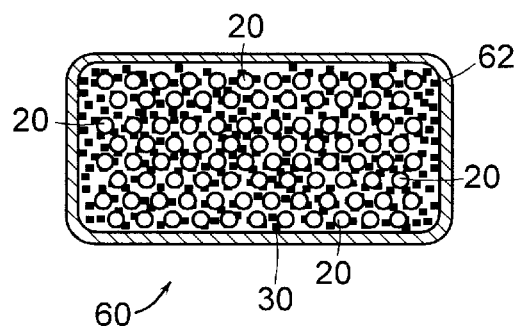
FIG. 6 is a schematic illustration of a preform.

The method can include a step of wrapping preform 60 made up of continuous reinforcement fibers 20 and binder 30 with a flexible refractory material 62 such as alumina cloth as shown in a top view in FIG. 6. The flexible refractory material 62 will protect the reinforcement phase from oxidation at the finished casting exterior surface, if the reinforcement phase is sensitive to oxidation.

Figure 7:
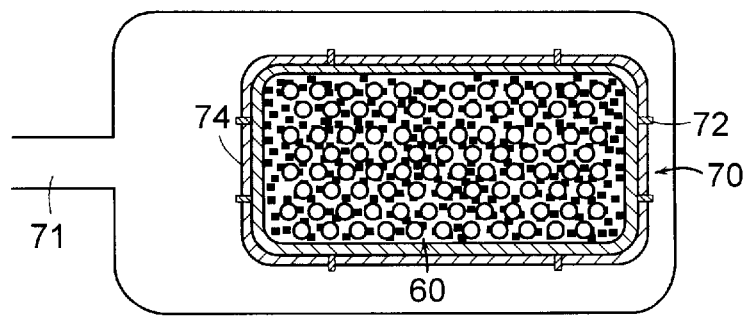
FIG. 7 is a schematic illustration of the preform shown in FIG. 6 encased in a layer of wax.

Preform 60 can be suspended in wax injection mold 70 with spacers 72 held in place by a friction fit or glued with a higher temperature wax to form a gap between wax injection mold 70 and preform 60. Spacers 72 will become embedded in wax layer 74 which is injected into wax injection mold 70 through wax injection port 71 as shown in FIG. 7. The spacers can be made from any refractory material which is able to withstand the pressure infiltration processing temperatures and which is chemically inert with respect to the infiltrant and can be metal or wettable ceramic material such as alumina, yttria, calcia, silica or nickel metal.

Figure 8:
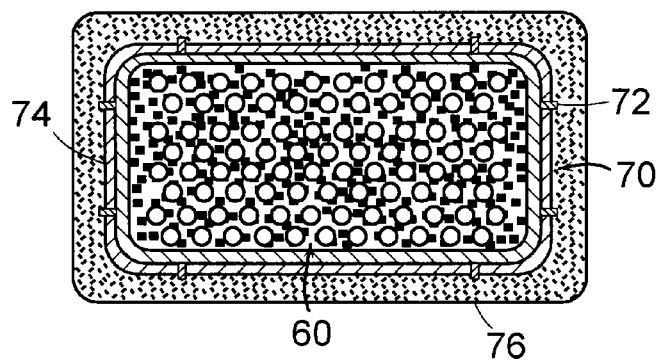
FIG. 8 is a schematic illustration of the wax injection mold shown in FIG. 7 surrounded by ceramic investment mold material.

Preform 60 can then be removed from the wax injection mold 70 and an investment mold can be formed directly around wax layer 74 by coating wax layer 74 with investment compound layer 76 as shown in FIG. 8 to form an investment mold. The investment compound can be any investment compound compatible with the molten infiltrant. Typical investment casting compounds include proprietary formulation with frit, silica, clays etc. Investment casting compounds can also include alumina silicates with various ratios of alumina to silica to pure alumina to pure silica, mullite and zircon sand to obtain a desired refractory property for the investment compound. The higher the alumina content, the more refractory the compound. Investment casting compound binders can include colloidal silica, ethyl silicate, sodium silicate and sol-gel alumina, zirconia and colloidal materials based on the foregoing compounds.

The investment mold configuration shown in FIG. 8 can then be heated so that the wax layer and binder are melted and evaporated away, leaving the mold suspended by spacers in the investment mold.

Figure 9:
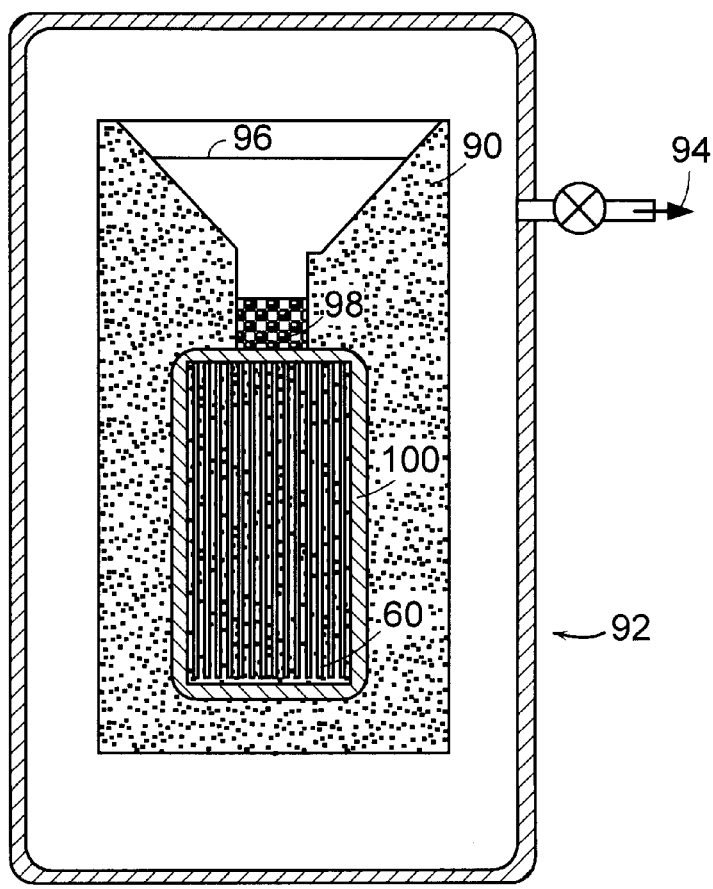
FIG. 9 is a schematic illustration in cross-section of the mold shown in FIG. 7 used in a pressure infiltration process before infiltration of the preform with the molten infiltrant.
Figure 10:
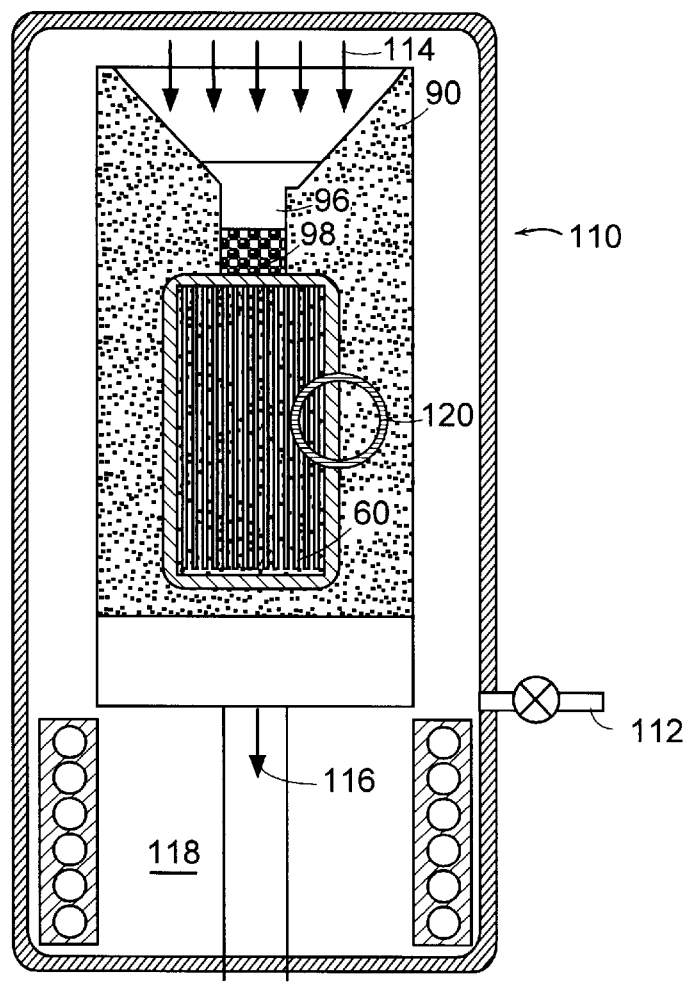
FIG. 10 is a schematic illustration of the pressure infiltration process shown in FIG. 9 after infiltration of the preform with the molten infiltrant.

FIGS. 9 and 10 illustrate the use of an investment mold in a pressure infiltration process. As shown in FIG. 9, investment mold 90 is placed within evacuation vessel 92 and heated to a temperature above the melting point of infiltrant material 96. Filter 98 prevents flow of molten infiltrant material 96 from prematurely entering preform 60 before the pressurization step. However, a molten infiltrant layer 100 surrounds preform 60 in the space left behind by removal of the wax layer. The molten infiltrant can get past the filter in a number of ways. The filter can be made from a non-wettable ceramic to prevent flow of material until a slight pressure, enough to drive the material through the mold, but not into the preform is applied. The surface of the mold material can be sealed with a colloidal and vitrified alumina or alumina silicate to prevent gas passage at low pressure through the investment material.

Alternatively, a loose filter that allows passage of the molten infiltrant under gravity to flow around and surround the preform can also be provided. Such a filter would only serve to filter dross from the molten infiltrant.

The layer of molten infiltrant serves to isolate a vacuum in the preform.

FIG. 10 shows investment mold 90 in pressure vessel 110. Pressure vessel 110 is pressurized by introduction of pressurized gas through pressurized gas inlet 112. The pressurized gas exerts a force in the direction given by arrows 114 which forces already molten infiltrant 96 through filter 98 and into evacuated preform 60. After the already-described infiltration process is complete, the mold can be lowered in the direction given by arrow 116 into chill zone 118 so that directional solidification can be conducted to solidify the molten infiltrant. All of the molds provided by the invention must be able to withstand the pressure exerted by the molten material being cast against the mold.

Figure 11:
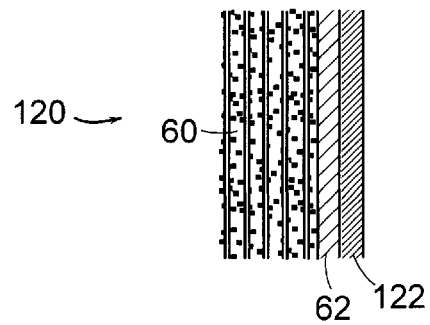
FIG. 11 is a detailed representation of the section of the preform in contact with the mold wall.

Region 120 where preform 60 wrapped with flexible refractory layer 62 contacts investment mold 90 after solidification as shown in detail in FIG. 11. In FIG. 11, infiltrated preform 60 is separated from molten infiltrant layer 122 by flexible refractory material 62. It is noted that the molds of the invention can be coated with a mold release compound such as colloidal graphite or boron nitride.

What is claimed is:

1. A reusable high density casting tooling comprising:
    a carbon char; and
    a refractory powder
wherein said reusable high density casting tooling has a volume fraction of solids in a range from about 65% to about 95%.

2. The high density casting tooling of claim 1 wherein said refractory powder is present in a volume fraction in the range of from about 0.50 to about 0.85.

3. The high density casting tooling of claim 1 wherein said refractory powder is a blend of a refractory powder having a first mean diameter and of a refractory powder having a second mean diameter wherein said first mean diameter is greater than said second mean diameter.

4. The high density casting tooling of claim 1 wherein said refractory powder is selected from the group consisting of silicon carbide, silicon nitride, titanium carbide, titanium nitride, boron carbide, mullite, alumina silicates, graphite, alumina, zirconia, yttria, silica, and mixtures thereof.

5. The high density casting tooling of claim 1 wherein said refractory powder has a mean diameter less than about 180 $\mu$m.

6. The high density casting tooling of claim 3 wherein said first mean diameter is less than about 180 $\mu$m.

7. A reusable high density casting tooling comprising:
    a refractory powder, and
    a carbon char;
wherein said reusable high density casting tooling is made by a method comprising the steps of:
    blending a high char resin with said refractory powder to form a moldable material, said refractory powder comprising particles having a mean particle size of less than about 180 microns,
    shaping said moldable material to form a green tooling body; and
    heating said green tooling body to convert said high char resin into said carbon char to form said reusable high density casting tooling.

8. A reusable high density casting tooling comprising:
    a refractory powder, and
    a carbon char;
wherein said reusable high density casting tooling is made by a method comprising the steps of:
    blending a high char resin comprising a filler with said refractory powder to form a moldable material,
    shaping said moldable material to form a green tooling body; and
    heating said green tooling body to convert said high char resin into said carbon char to form said reusable high density casting tooling.

9. A reusable high density casting tooling comprising:
    a refractory powder comprising particles having a first mean diameter
    a refractory powder comprising particles having a second mean diameter, and
    a carbon char;
wherein said reusable high density casting tooling is made by a method comprising the steps of:
    blending a high char resin with said refractory powder comprising particles having a first mean diameter and said refractory powder comprising particles having a second mean diameter to form a moldable material,
    shaping said moldable material to form a green tooling body; and
    heating said green tooling body to convert said high char resin into said carbon char to form said reusable high density casting tooling.

\* \* \* \* \*